Aug. 4, 1931.  W. N. BOOTH  1,816,925

VEHICLE WHEEL

Filed April 11, 1927

Inventor
William N. Booth
By Whittemore Hulbert
Whittemore & Belknap
Attorney's

Patented Aug. 4, 1931

1,816,925

UNITED STATES PATENT OFFICE

WILLIAM N. BOOTH, OF DETROIT, MICHIGAN, ASSIGNOR TO KELSEY-HAYES WHEEL CORPORATION, OF DETROIT, MICHIGAN, A CORPORATION OF NEW YORK

VEHICLE WHEEL

Application filed April 11, 1927. Serial No. 182,823.

The invention relates to vehicle wheels and has for its main object the forming of a hub, a wire wheel body, a disk wheel body and a wooden spoked wheel body in such a manner that either of the bodies may be mounted upon the hub and the tire carrying rim upon either of these bodies occupy substantially the same position relative to the hub. Another object is to provide bolts upon the hub which may be used in securing either of the bodies to the hub. A further object resides in the features of construction of the wooden spoked wheel body adapting the same for mounting upon the hub. With these as well as other objects in view, the invention resides in the combinations and arrangements of parts as more fully hereinafter set forth.

In the drawings:—

Figure 1:
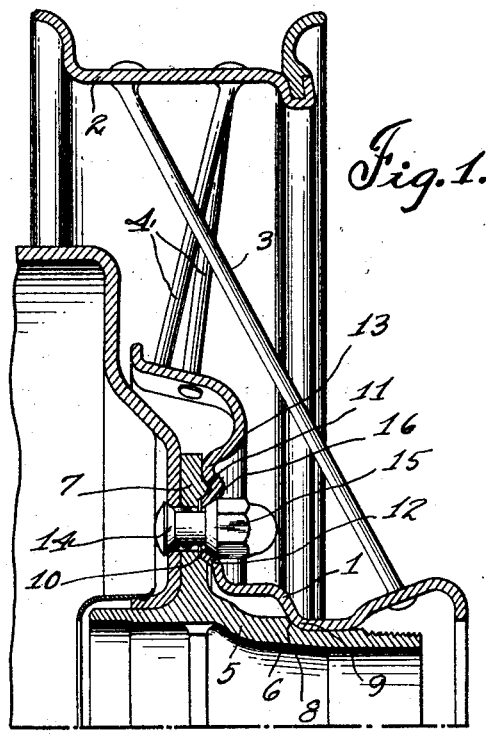
Figure 1 is a transverse section through a wire wheel.

As shown in Figure 1, the wire wheel body comprises the hub shell 1 formed of sheet metal, the rim 2 which in the present instance is a tire carrying rim, and the front and rear sets of spokes 3 and 4 respectively connecting the hub shell to the rim. 5 is the hub having the barrel 6 and the radial fixed flange 7. The barrel has the annular shoulder 8 for cooperating with the annular shoulder 9 upon the hub shell while the fixed flange has the series of recesses 10 in its front face formed with tapered annular walls 11 for engagement with the outer faces of the tapered annular projections 12 upon the hub shell. Outwardly beyond these tapered annular flanges is the annular rib 13 which is adapted to contact with the fixed flange 7 near its outer edge. The annular shoulder 9, the annular rib 13 and the annular projections 12 and their cooperating faces upon the hub 5 are so arranged that when the wire wheel body is being secured to the hub the annular shoulder 9 first contacts with the annular shoulder 8 upon the hub barrel 6, then the annular rib 13 contacts with the fixed hub flange 7 and finally the annular projections 12 contact with the annular walls 11 upon the fixed hub flange, this being permitted by resilient flexing of the hub shell and particularly its radially extending portion formed with the annular rib 13 and the annular projections 12.

To secure the wire wheel body to the hub, I have provided the series of transverse bolts 14 which are non-rotatably fixedly secured in the fixed hub flange 7 and extend axially through the recesses 10 and also through the annular projections 12. These bolts are engageable by the nuts 15 having tapered annular faces 16 for engaging the inner faces of the annular projections 12. With this arrangement the annular projections 12 drive the wire wheel body with the hub and further resiliently frictionally lock the nuts upon the bolts.

Figure 2:
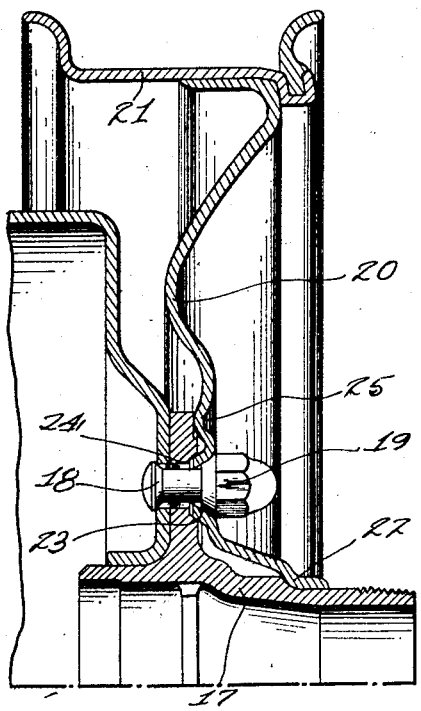
Figure 2 is a transverse section through a disk wheel.

As shown in Figure 2, the hub 17 is the same as the hub 5 and the transverse securing bolts 18 are also the same as the bolts 14 and also the nuts 19 may be the same as the nuts 15. Detachably mounted upon this hub is the disk wheel body comprising the disk 20 and the rim 21, which in the present instance is a tire carrying rim. The disk is provided at its inner edge with the annular shoulder 22 for cooperating with the annular shoulder upon the barrel of the hub and is provided with the outwardly spaced series of tapered annular projections 23 for engaging the recesses 24 in the fixed hub flange. Outwardly beyond these annular projections the disk is provided with the annular rib 25 for contacting with the front face of the fixed hub flange. The arrangement is such that the median plane of the rim 21 occupies the same position relative to the hub or more particularly its fixed flange as the median plane of the rim 2 to the hub or its fixed flange, as shown in Figure 1.

Figure 3:
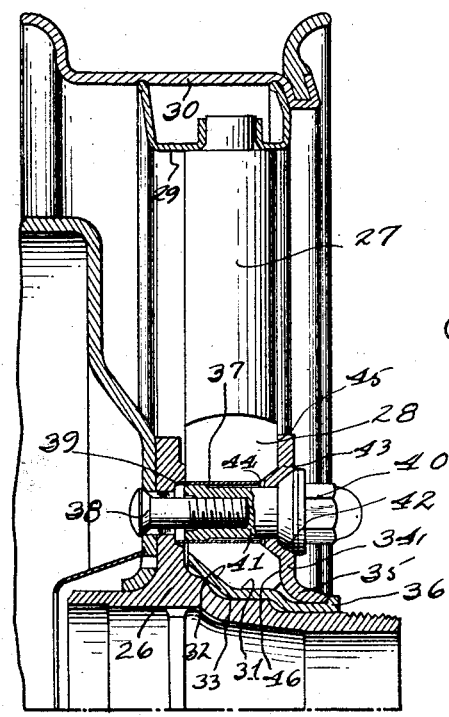
Figure 3 is a transverse section through a wooden spoked wheel.

As shown in Figure 3, a wooden spoked wheel body is mounted upon the hub 26 which is exactly the same as the hubs 5 or 17. In order to make this wooden spoked wheel body interchangeable with the wire wheel or disk wheel bodies so that it may be mounted upon the same hub and the median plane of its tire carrying rim occupies substantially the same position relative to the hub as the median plane of the tire carrying rims of the other bodies, I have constructed the wooden spoked wheel body as follows: 27 are the wooden spokes having inner beveled ends 28 which are located immediately adjacent the front face of the fixed hub flange as is also the case in the other types of wheel bodies previously mentioned. 29 is the channel shaped metallic felly at the outer ends of the spokes and 30 is the tire carrying rim. This rim is shrunk upon the flanges of the felly and is laterally offset rearward relative to the felly so that the median plane of the rim will be properly located relative to the hub. At the same time the connection betwen the rim and felly is substantial. The wooden spoked wheel body is formed at the inner ends of its spokes with the hub opening 31 which has an enlarged and preferably beveled rear end portion 32. 33 is a bushing fitting into this opening and adapted to slidably engage the barrel of the hub 26 rearwardly of its annular shoulder. 34 is a resilient clamping plate or ring at the front side of the beveled inner ends 28 of the spokes and having at its inner edge the forwardly extending flange 35 abutting the outwardly extending annular flange 36 at the front end of the bushing 33, the arrangement being such that the clamping plate or ring is firmly secured to the wooden spoked wheel body and forms a unit therewith. The beveled inner ends 28 of the spokes are provided with the transverse openings 37 in alignment or registering with the securing bolts 38 which are the same as the securing bolts 14 and 18. These openings have a diameter such that they may receive sleeve members 39 which are adapted to extend into the recesses in the front face of the fixed hub flange and contact with their tapered annular walls to rotatively position and hold the wooden spoked wheel body relative to the hub. 40 are the clamping nuts which have the shanks 41 extending within the sleeve members 39 and are threaded upon the bolts 38. These nuts also have the tapered annular shoulders 42 which are engageable with the inner faces of the tapered annular projections 43 upon the clamping plate or ring 34. The outer faces of these annular projections are adapted to be forced into contact with corresponding walls of the recesses 44 in the front faces of the beveled ends 28 of the spokes, these recesses forming in effect enlargements at the front ends of the transverse openings 37. The clamping plate or ring 44 is so arranged that it normally bears upon the beveled ends 28 of the spokes near its outer edge as at 45 and near its inner edge as at 46, the intermediate portion being provided with the annular projections. As a result, tightening up of the nuts 40 resiliently secures the spoked wheel body to the hub and the clamping plate or ring serves to resiliently frictionally lock the nuts upon their bolts.

From the above description, it will be readily seen that I have so formed the hub, the wire wheel body, the disk wheel body and the wooden spoked wheel body that either of of these bodies may be mounted upon the same hub and the tire carrying rim secured to this body occupies the same position relatively to the hub. It will also be seen that the construction is such that the same securing bolts may be used and further that means is provided for driving either of the bodies from the hub independent of the securing bolts or nuts, the latter being used to hold the wheel body upon the hub.

What I claim as my invention is:

In a vehicle wheel, in combination, a hub member having a radial fixed flange with recesses in its front face, transverse bolts upon said fixed flange extending through said recesses, a wooden spoked wheel body mounted upon said hub member immediately adjacent the front face of said fixed flange and having transverse openings in alignment with said bolts, means for holding said body positioned with respect to said hub member including a sleeved member within one of the transverse openings of said body and extending into one of the recesses of said fixed flange, and means for detachably securing said body to said hub member including a nut threaded upon one of said bolts.

In testimony whereof I affix my signature.

WILLIAM N. BOOTH.